March 31, 1953
G. O. HOFFSTETTER
2,633,255
TWIN SCREW CONVEYER
Filed March 5, 1951
7 Sheets-Sheet 1
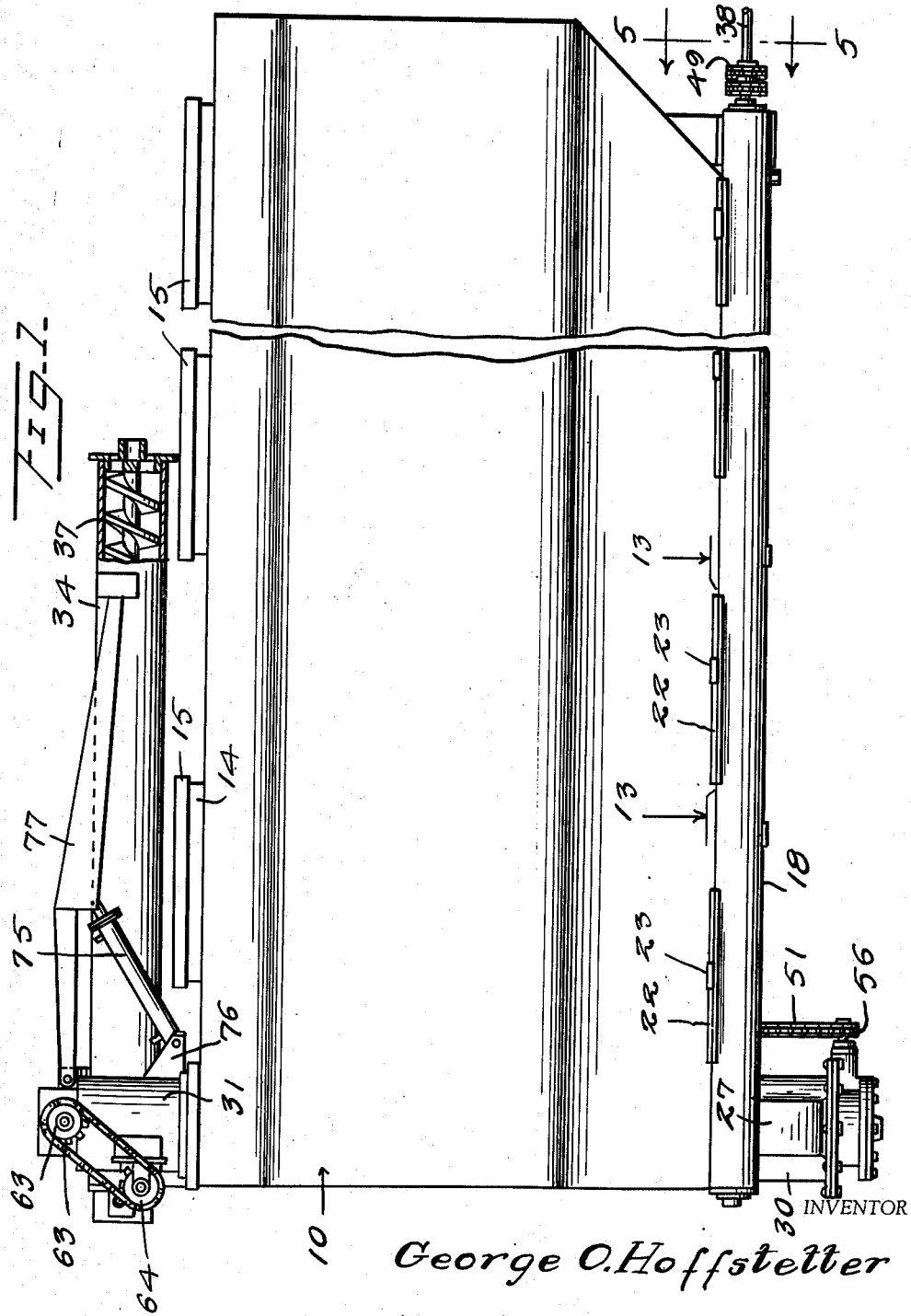
INVENTOR
George O. Hoffstetter
BY Kimmel & Crowell
ATTORNEYS March 31, 1953     G. O. HOFFSTETTER     2,633,255
TWIN SCREW CONVEYER
Filed March 5, 1951     7 Sheets-Sheet 2
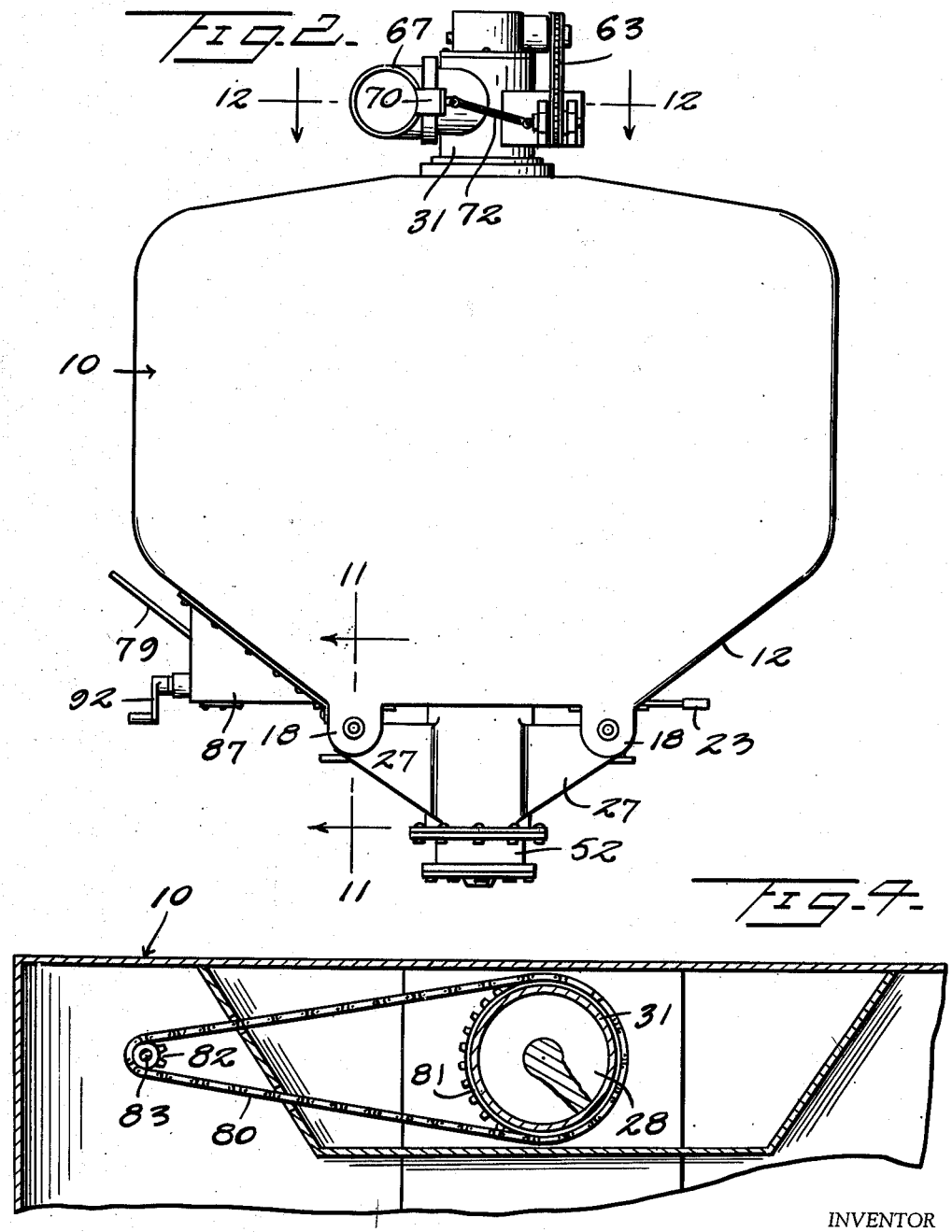
INVENTOR
George O. Hoffstetter
BY Kimmel & Crowell
ATTORNEYS March 31, 1953 G. O. HOFFSTETTER 2,633,255
TWIN SCREW CONVEYER
Filed March 5, 1951 7 Sheets-Sheet 3
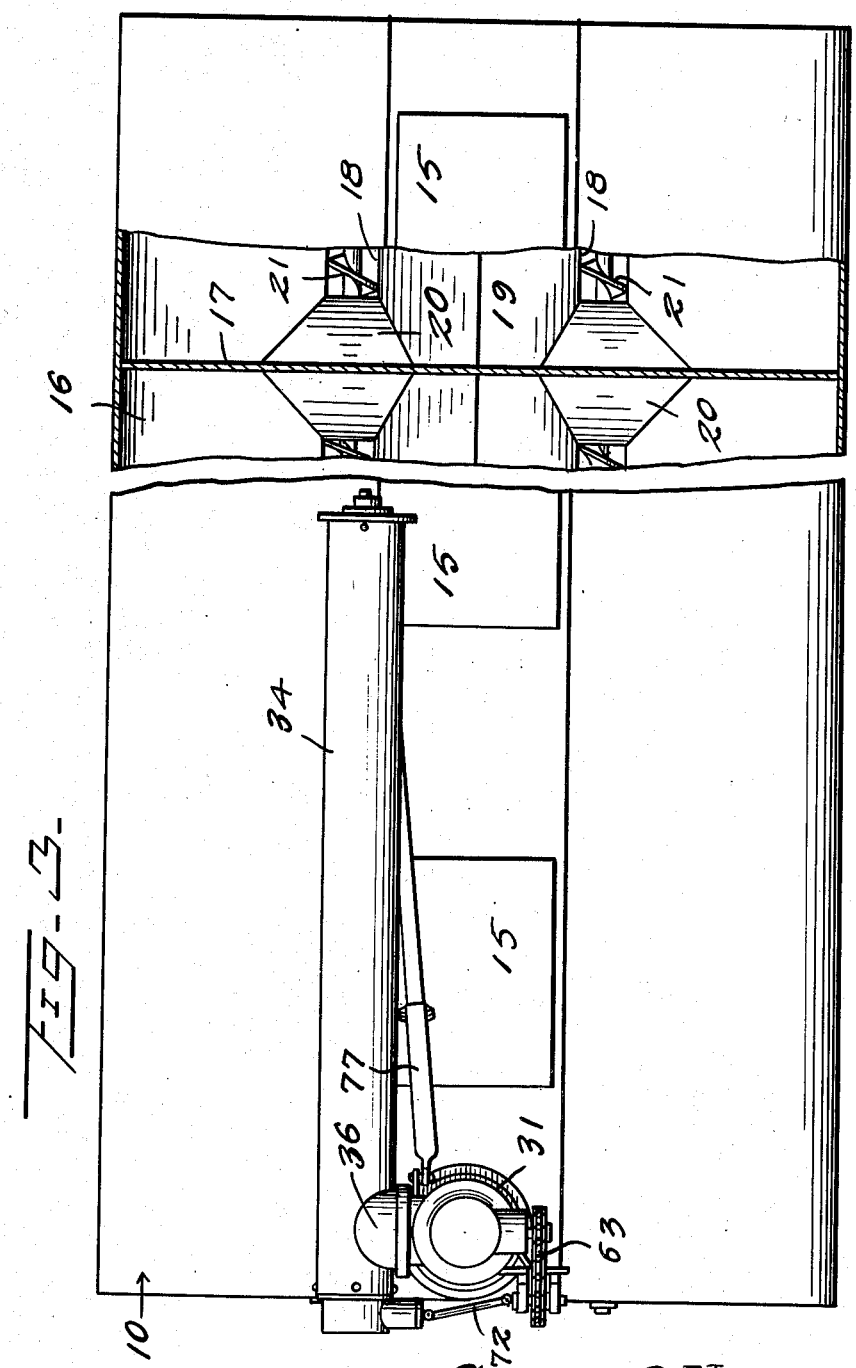
INVENTOR
George O. Hoffstetter
BY Kimmel & Crowell
ATTORNEYS

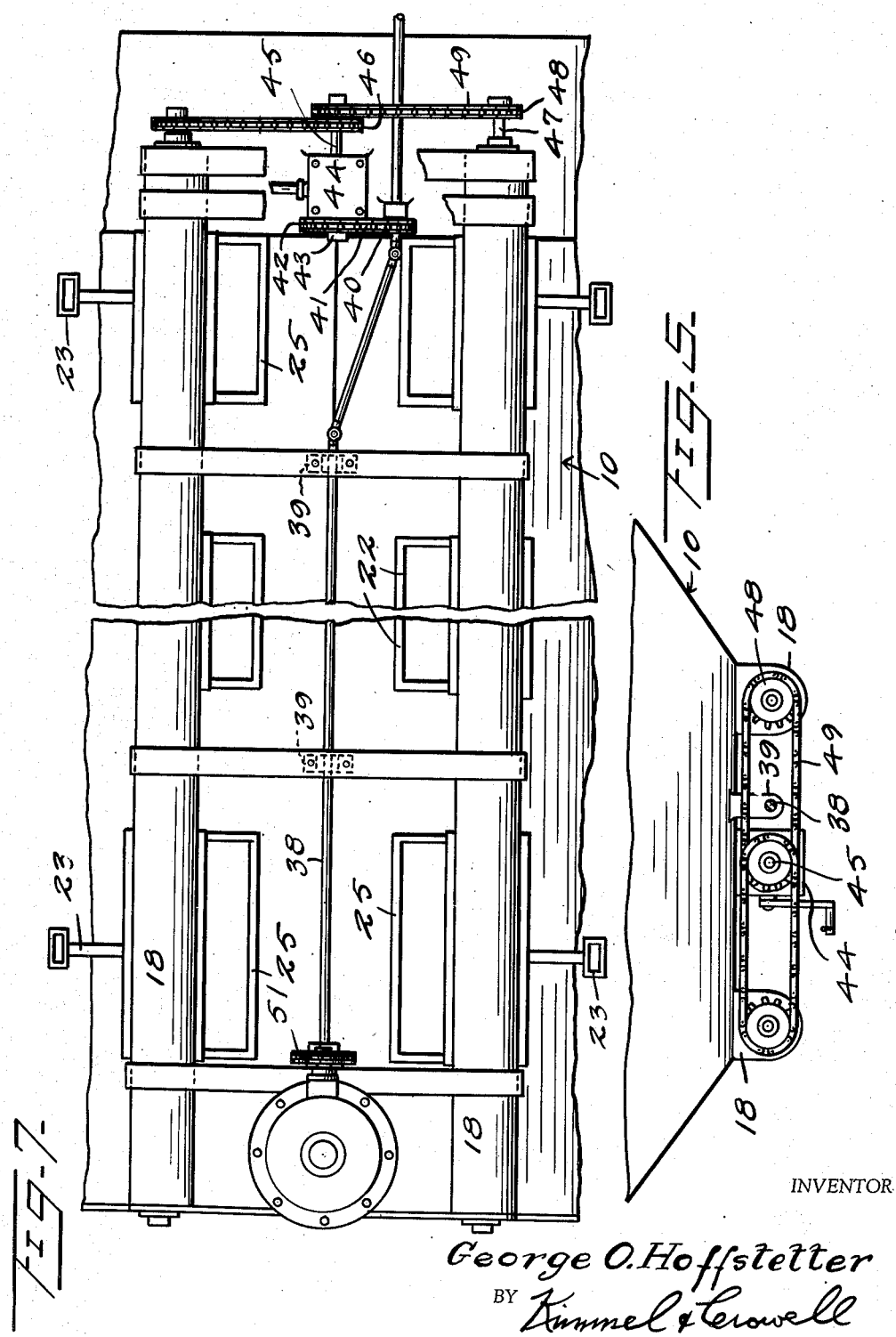

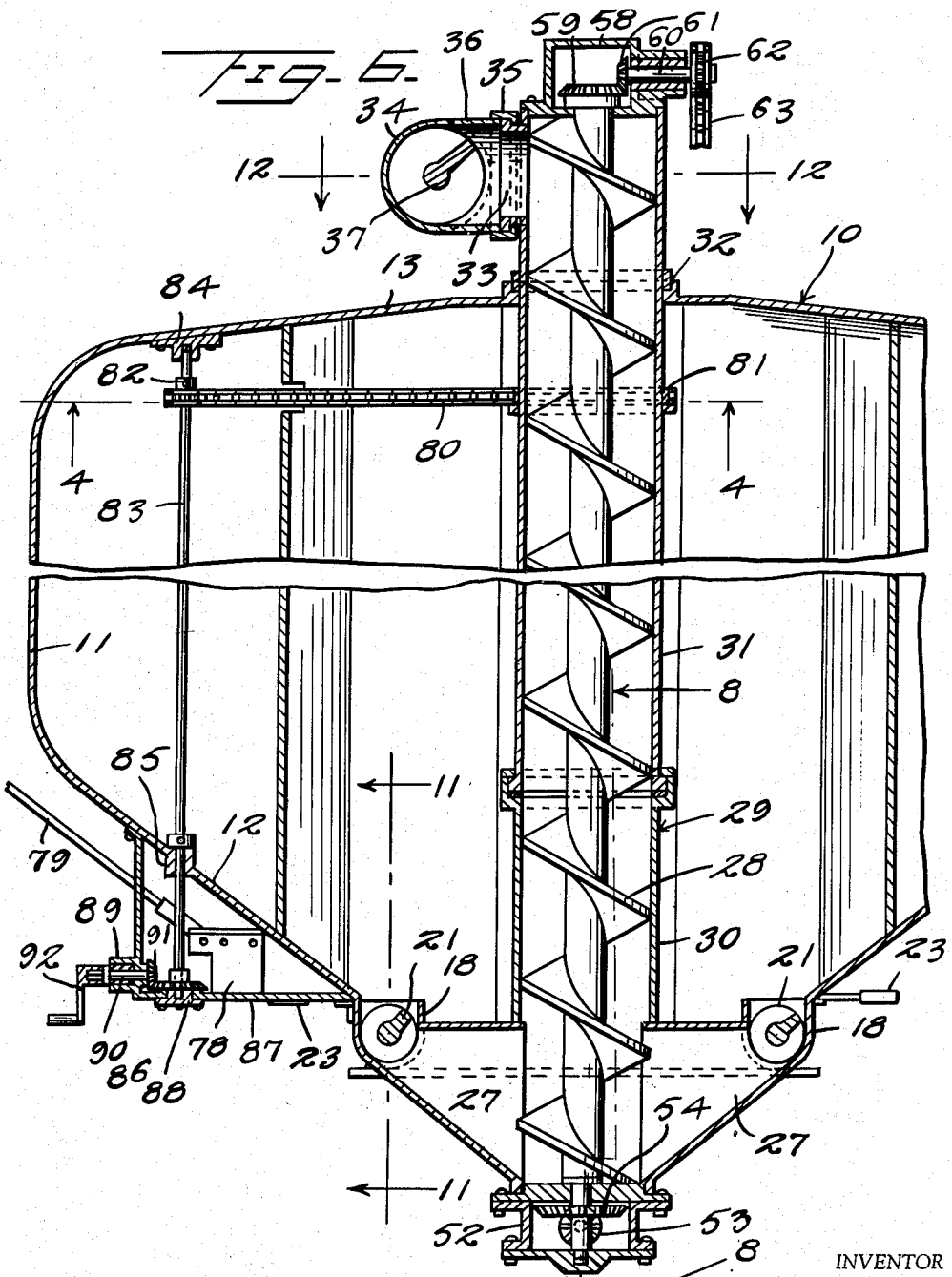

March 31, 1953     G. O. HOFFSTETTER     2,633,255
TWIN SCREW CONVEYER
Filed March 5, 1951     7 Sheets-Sheet 6
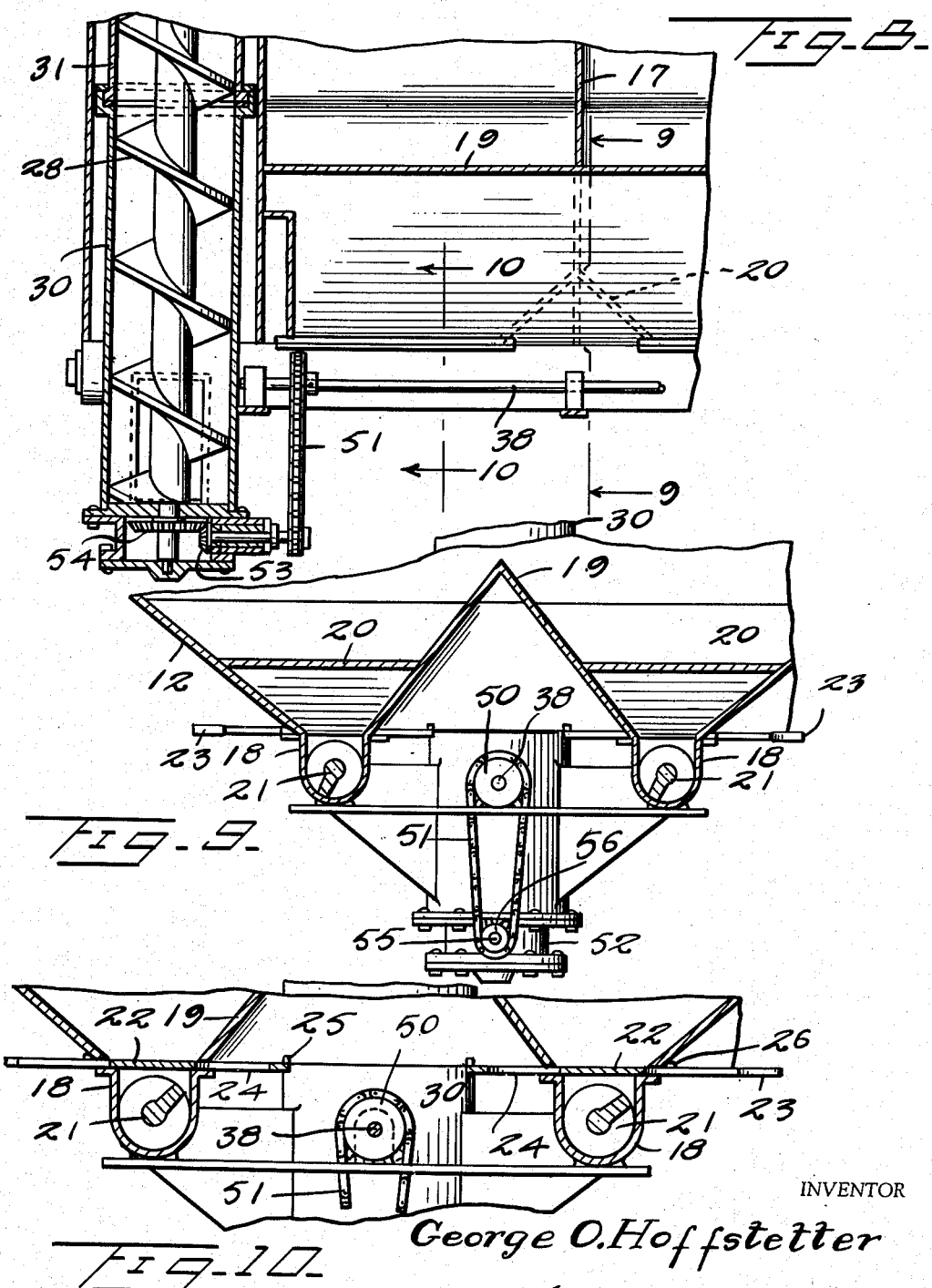
INVENTOR
George O. Hoffstetter
BY Kimmel & Crowell
ATTORNEYS March 31, 1953  G. O. HOFFSTETTER  2,633,255
TWIN SCREW CONVEYER
Filed March 5, 1951  7 Sheets-Sheet 7
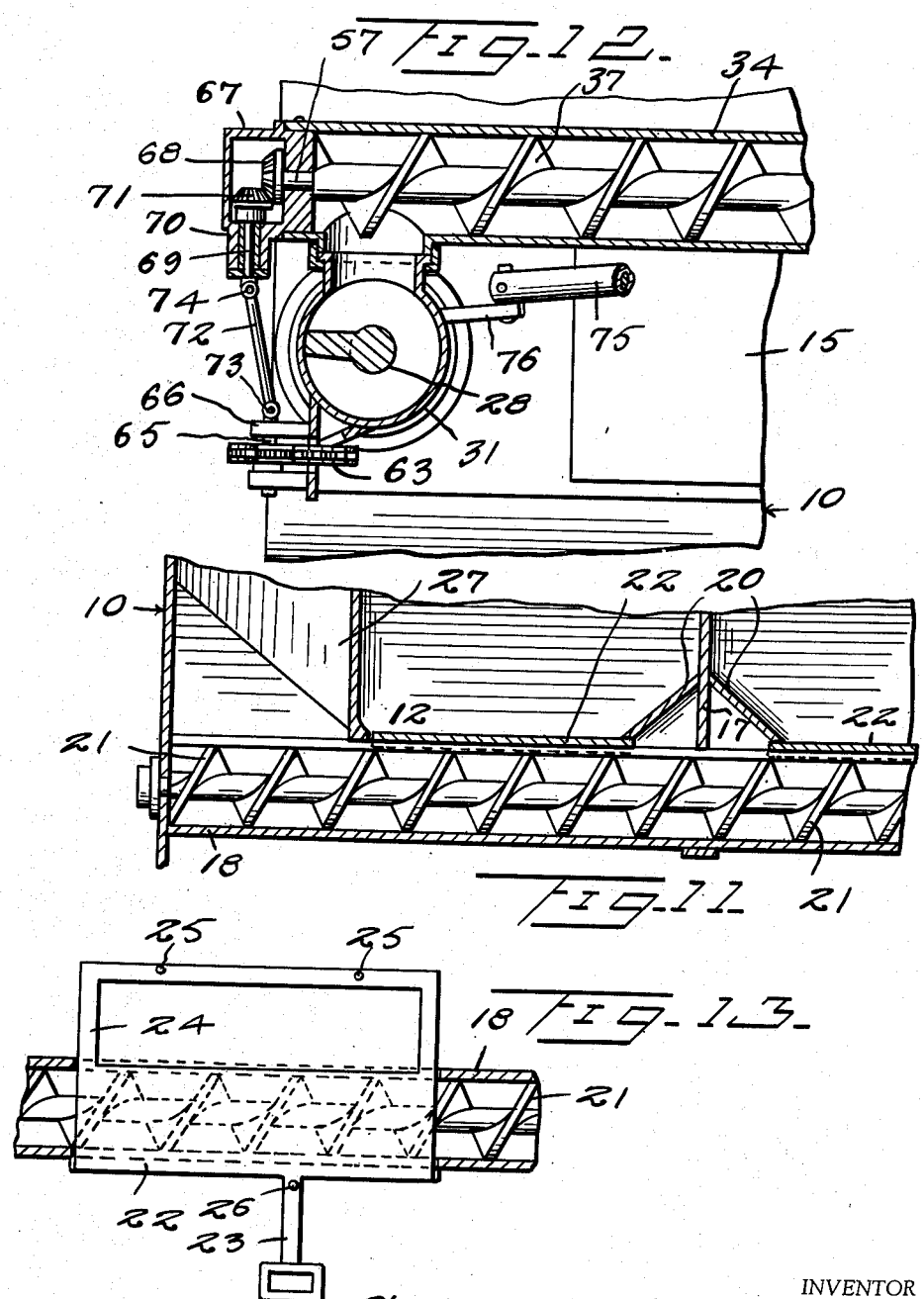
INVENTOR
George O. Hoffstetter
BY Kimmel & Crowell
ATTORNEYS Patented Mar. 31, 1953

2,633,255

UNITED STATES PATENT OFFICE 2,633,255

TWIN SCREW CONVEYER

George O. Hoffstetter, Jerseyville, Ill.

Application March 5, 1951, Serial No. 213,890

1 Claim. (Cl. 214—17)

This invention relates to a material conveyor.

An object of this invention is to provide a material conveying and discharging body adapted to be mounted on a mobile frame which is of the large capacity type and embodies a hopper having a pair of hopper discharge screws in the bottom thereof with an elevator screw at the rear and a discharge tube communicating with the elevator.

Another object of this invention is to provide in a combined hopper and conveyor, a vertically disposed elevator disposed at the rear of the hopper inside the rear of the hopper with a pivoted delivery tube connected with the upper end of the elevator, the tube being swingable about a horizontal axis carried by the elevator housing, and the latter being swingable about a vertical axis so that the delivery tube may be substantially universally adjusted.

A further object of this invention is to provide a material conveyor wherein the delivery tube has a screw conveyor mounted therein so that the material may be discharged from the delivery tube with the latter disposed on an upward inclination. With a construction of this kind the delivery tube constitutes an auxiliary elevator for delivering the material to a height above the hopper.

With the above and other objects in view, my invention consists in the arrangement, combination and details of construction disclosed in the drawings and specification, and then more particularly pointed out in the appended claim.

In the drawings:

Figure 1 is a detailed side elevation partly broken away and in section of a material conveyor and delivering means constructed according to an embodiment of this invention.

Figure 2 is a rear end view of the device.

Figure 3 is a top plan partly broken away and in section of the device.

Figure 4 is a fragmentary sectional view taken on the line 4—4 of Figure 6.

Figure 5 is a fragmentary front end view of the device taken substantially on the line 5—5 of Figure 1.

Figure 6 is a fragmentary vertical section of the device taken adjacent the rear thereof.

Figure 7 is a fragmentary bottom plan view of the device.

Figure 8 is a fragmentary sectional view taken on the line 8—8 of Figure 6.

Figure 9 is a fragmentary sectional view taken on the line 9—9 of Figure 8.

Figure 10 is a fragmentary sectional view taken on the line 10—10 of Figure 8.

Figure 11 is a fragmentary sectional view taken on the line 11—11 of Figure 6.

Figure 12 is a fragmentary sectional view taken on the line 12—12 of Figure 6.

Figure 13 is a fragmentary sectional view taken on the line 13—13 of Figure 1.

Referring to the drawings the numeral 10 designates generally a hopper which is formed of opposite side walls 11, a top wall 13 and downwardly and inwardly convergent bottom wall members 12. The hopper body 10 is adapted to be mounted on a mobile frame (not shown), and the top wall 13 is provided with a plurality of upwardly extending nipples or flanges 14 on which closure caps 15 are removably mounted.

The interior of the hopper body 10 is divided into a plurality of compartments 16 by means of transversely disposed partition members 17. The bottom of the hopper 10 has extending longitudinally thereof a pair of downwardly projecting conveyor channels 18 which are disposed in spaced apart relation, and an inverted V-shaped member 19 is disposed within the hopper 10 with the divergent end thereof lowermost and merging into the inner walls of the U-shaped conveyor channels or housings 18.

The interior of the hopper body 10 is also provided with downwardly and inwardly inclined inner walls 20 which extend downwardly from the partition members 17 and terminate at the upper edges of the conveyor housings 18. A pair of screw conveyors 21 are disposed one in each of the housings 18 and provide a means whereby the material in the compartments 16 may be moved to one end and preferably to the rear end of the hopper body 10. In order to provide a means whereby the amount of material being discharged from the compartments 16 into the conveyor housings 18 may be regulated, I have provided a horizontally slidable and adjustable valve plate 22 which is provided with a laterally projecting handle 23.

The valve plate 22 includes a U-shaped extension 24 having one or more stop members 25 which are adapted to limit the outward adjustment of the valve plate 22 when the latter is moved to an open position. At least one stop member 26 is provided at the outer edge of the valve plate 22 as shown in Figure 13 so as to limit the inward movement of the valve plate to a closed position.

Through the use of the valve plates 22 the amount of material being discharged from a compartment in the hopper may be regulated as may be desired, and it will be understood that there may be different kinds of material in the several compartments. The conveyor housings 18 communicate at their rear ends with a receiving chamber 27 formed at the rear of the hopper body, and the material discharged into the receiving chamber 27 is adapted to be elevated by means of a vertically disposed screw elevator 28. The elevator 28 is rotatably disposed in a tubular housing generally designated as 29, and the housing 29 is formed of a lower stationary housing member 30 and an upper rotatable housing member 31.

The housing member 31 projects upwardly through a bushing 32 carried between top wall 13 and extends a short distance above the top wall 13. The upper end of the housing member 31 is provided with a laterally disposed opening 33, and a delivery tube or housing 34 which is formed with a flanged bushing 35 and a laterally projecting nipple 36 rotatably engages the housing member 31 and communicates with the upper end portion of housing member 31 through opening 33.

The tubular delivery member 34 has rotatably mounted therein a delivery screw 37 which provides a means whereby, as will be hereinafter described, the delivery tube 34 may be used for delivering material from the hopper 10 to a receiver or collector which may be disposed above the hopper 10.

A longitudinally disposed drive shaft 38 is journalled in bearings 39 carried by the bottom of the hopper body, and the drive shaft 38 is adapted to be connected at its forward end to a suitable source of power supply. The drive shaft 38 has secured thereto a sprocket 40 about which a chain 41 engages, and the chain 41 also engages about a sprocket 42 mounted on a speed changer shaft 43. The shaft 43 is connected with a conventional speed changer 44 and the speed changer 44 also includes a forwardly extending shaft 45 having a pair of sprockets 46 secured thereto.

Each screw member 21 includes a shaft 47 having a sprocket 48 secured thereto and a chain 49 engages about the sprocket 48 and one of the pairs of sprockets 36. The drive shaft 38 extends rearwardly and has secured thereon adjacent the rear end thereof a sprocket 59 about which a chain 51 engages. A gear housing 52 is disposed below the elevator member 28, and the latter has a shaft 53 extending into the housing 52 on which a beveled gear 54 is secured.

A horizontally disposed forwardly extending shaft 55 projects from the gear housing 52 and has a beveled gear 56 secured to the rear or inner end thereof. The forward end of the shaft 55 has secured thereto a sprocket 56 about which the chain 51 engages. The delivery screw or conveyor 37 which includes a rearwardly projecting shaft 57 is rotated from the upper end of elevator member 28. The upper end of elevator member 28 extends into an upper gear housing 58, and a beveled gear 59 is secured to the upper end of elevator member 28.

A horizontally disposed shaft 60 extends from the gear housing 58 and has a beveled gear 61 secured to the inner end thereof meshing with gear 59. The outer end of shaft 60 has secured thereto a sprocket 62 about which an endless chain 63 engages and the chain 63 engages about a sprocket 64 which is secured to a shaft 65 journaled in a bearing 66.

The rear end of delivery housing 34 has secured thereto a gear housing 67, and the rear end of shaft 57 of delivery conveyor 37 has secured thereto a beveled gear 68. A shaft 69 is journaled in a bushing 70 carried by the gear housing 67, and the inner end of shaft 69 has secured thereto a beveled gear 71 meshing with gear 68. The two shafts 65 and 69 are connected together by an intermediate angularly disposed shaft 72 which is connected with the shaft members 65 and 69 by universal joints 73 and 74, respectively.

The delivery housing 34 is adapted to be vertically rocked and held in adjusted angular position with respect to the vertical by means of a hydraulic member 75 which is rockably mounted on a projection 76 carried by the upper elevator housing member 31 and is connected at its forward end to an angularly disposed bracing bar 77 which is connected between the forward portion of delivery member 34 and the upper end of the elevator housing 31.

Fluid is forced into the hydraulic member 75 through a hydraulic pump 78 secured to the hopper body 10 at a convenient location, and preferably the pump 78 is operated by means of a handle or lever 79. The upper elevator housing member 31 and the delivery housing or tube 34 are adapted to be rotated about the axis of the elevator screw 28 by means of a chain 80 which engages about a sprocket 81 secured about the housing member 31, and the chain 80 also engages about the sprocket 82 which is fixed to a vertically disposed shaft 83.

The shaft 83 is journaled at its upper end in a bearing 84 secured to the inner side of the top wall 13 and projects downwardly through a bearing bushing 85 carried by one of the bottom wall members 12. The lower end of shaft 83 is journaled in a bearing 86 carried by a supporting bracket 87 and a beveled gear 88 is fixed to the lower end portion of shaft 83. A horizontally disposed and laterally extending crankshaft 89 is journaled in a bearing 90 carried by the bracket 87, and shaft 89 has secured to the inner end thereof a beveled gear 91 meshing with gear 88.

A crank member 92 is adapted to be removably mounted on crankshaft 89 so that housing member 31 and delivery member 34 may be rotatably adjusted to provide for discharge of the material to the desired location.

In the use and operation of this conveyor the material is discharged into the several compartments 16 of the hopper 10 by removing the caps or closure members 15. At the time the material is discharged into the compartments 16 the valve members or plates 22 will be disposed in their innermost position wherein the valve members 22 are in their closed position as shown in Figure 13. The drive shaft 38 is connected to a suitable source of power supply which may be in the form of an internal combustion engine mounted at one end of the hopper body or may be in the form of a power take-off of a tractor vehicle.

When it is desired to discharge material from any selected compartment 16 the associated valve plate 22 is moved outwardly to an open position permitting the material in the selected compartment to drop into the conveyor housing member or members 18.

It will be understood that the rate of discharge of the material from the hopper body may be closely regulated by opening either one valve plate 22 so that the material will only be discharged through one conveyor housing 18 or the opposed valve plates associated with the same compartment may be moved to an open position to permit the material to drop into both of the conveyor housings 18.

The material moved rearwardly by the conveyor screws 21 will be discharged into the receiver chamber 27, and the material in this chamber will be elevated by the elevator screw 28. At the time the hopper is being readied for delivery of material, the delivery housing 34 is swung outwardly and rearwardly from the normal overlying position overlying top wall 13 to either a laterally or rearwardly extending position with respect to the hopper.

The rearward adjustment of delivery member 34 is accomplished by turning crank 92 which will turn elevator housing member 31, and at the same time the delivery member 34 will be swung angularly about the vertical axis of conveyor screw 28. The angular position of delivery member 34 may be adjusted by operating pump 78 which will raise or lower the outer end of delivery member 34.

Through the medium of the delivery conveyor 37 within the delivery housing 34 the latter may be angularly adjusted with respect to the vertical so that the delivery member 34 may be inclined either upwardly or downwardly or may be disposed in a horizontal position.

What is claimed is:

A material conveyor comprising a hopper, a pair of spaced apart horizontal screw conveying means at the bottom of said hopper for moving the material to one end of said hopper, partitions dividing said hopper into compartments, independent adjustable valve means carried by each compartment of said hopper for regulating the discharge of material from each of said compartments to said horizontal conveying means, a receiving chamber at said one end of said hopper adapted to receive the material moved by both elements of said pair of horizontal screw means, a vertical housing at said one end of said hopper communicating with said chamber, said housing being formed of a fixed lower part and a rotatable upper part, a flange on said upper part and a channeled sleeve on said lower part surrounding said flange to provide a rotatable connection between said upper and lower parts, means for rotating said upper part, said means including a chain surrounding said upper part, a sprocket for said chain, a shaft for said sprocket, coacting bevel gears for rotating said shaft, and a crank for manual rotation of said bevel gears, a delivery tube at the upper end of said housing, horizontal pivot means securing said delivery tube to said housing for vertical inclination thereof, means for varying the vertical inclination of said delivery tube relative to said housing, means for securing said delivery tube in a desired angular position, a screw conveyor in said delivery tube, and an arm operative connection between said elevator screw and said screw conveyor.

GEORGE O. HOFFSTETTER.

REFERENCES CITED

The following references are of record in the file of this patent:

UNITED STATES PATENTS

| Number | Name | Date |
|---|---|---|
| 802,698 | Kern | Oct. 24, 1905 |
| 2,412,121 | Bradshaw | Dec. 3, 1946 |
| 2,481,860 | Miller | Sept. 13, 1949 |
| 2,504,289 | Waterman | Apr. 18, 1950 |
| 2,516,360 | Adams | July 25, 1950 |